(12) United States Patent
Clark

(10) Patent No.: US 8,954,315 B2
(45) Date of Patent: Feb. 10, 2015

(54) SYSTEM AND METHOD FOR MIXED-LANGUAGE SUPPORT FOR APPLICATIONS

(75) Inventor: Dale L. Clark, Lynnwood, WA (US)

(73) Assignee: CA, Inc., New York, NY (US)

( * ) Notice: Subject to any disclaimer, the term of this patent is extended or adjusted under 35 U.S.C. 154(b) by 785 days.

(21) Appl. No.: 13/270,032

(22) Filed: Oct. 10, 2011

(65) Prior Publication Data

US 2013/0090915 A1 Apr. 11, 2013

(51) Int. Cl.
*G06F 17/28* (2006.01)

(52) U.S. Cl.
CPC .................................... *G06F 17/289* (2013.01)
USPC .................................................. 704/8; 704/2

(58) Field of Classification Search
CPC ...................................................... G06F 17/289
USPC ........................................................... 704/2, 8
See application file for complete search history.

(56) References Cited

U.S. PATENT DOCUMENTS

| 5,075,850 A | 12/1991 | Asahioka et al. ................. 704/2 |
| 5,873,055 A | 2/1999 | Okunishi .......................... 704/2 |
| 6,370,498 B1 * | 4/2002 | Flores et al. ...................... 704/3 |
| 6,993,472 B2 | 1/2006 | Redpath ............................ 704/2 |
| 7,495,689 B2 * | 2/2009 | Curtis et al. ............... 348/207.1 |
| 7,634,397 B2 * | 12/2009 | Suen et al. ......................... 704/8 |
| 7,680,646 B2 * | 3/2010 | Lux-Pogodalla et al. ........ 704/2 |
| 7,707,026 B2 * | 4/2010 | Liu ..................................... 704/7 |
| 7,877,251 B2 | 1/2011 | Kumaran et al. ................. 704/2 |
| 7,904,291 B2 | 3/2011 | Kamatani et al. ................. 704/2 |
| 7,970,598 B1 | 6/2011 | Flanagan et al. .................. 704/2 |
| 2001/0029455 A1 * | 10/2001 | Chin et al. ..................... 704/277 |
| 2002/0019839 A1 * | 2/2002 | Shiu ............................... 707/536 |
| 2002/0133523 A1 * | 9/2002 | Ambler et al. ................ 707/536 |
| 2002/0169592 A1 * | 11/2002 | Aityan ............................... 704/2 |
| 2002/0193985 A1 * | 12/2002 | Park .................................. 704/8 |
| 2003/0046058 A1 * | 3/2003 | Stuckler et al. ................... 704/7 |
| 2008/0040095 A1 * | 2/2008 | Sinha et al. ....................... 704/2 |
| 2010/0204981 A1 | 8/2010 | Ribeiro et al. .................... 704/8 |
| 2010/0268525 A1 * | 10/2010 | Kim et al. ......................... 704/2 |
| 2011/0134910 A1 | 6/2011 | Chao-Suren et al. ......... 370/352 |

* cited by examiner

*Primary Examiner* — Jialong He
(74) *Attorney, Agent, or Firm* — Pillsbury Winthrop Shaw Pittman LLP

(57) ABSTRACT

Provided are systems and methods for multilingual support for users in a computing environment. The systems and methods may receive and store communications from a user in a first language. If the first language does not match a standard language of the environment, the communication may be translated to the standard language. If a subsequent access request for the stored communication is received, it may be determined whether a language associated with the request matches the standard or first language. If there is a match, the stored original user communication or the stored standard language version maybe returned. If the access request language does not match either language, the user communication may be translated to a language associated with the request directly from the stored original user communication.

21 Claims, 3 Drawing Sheets

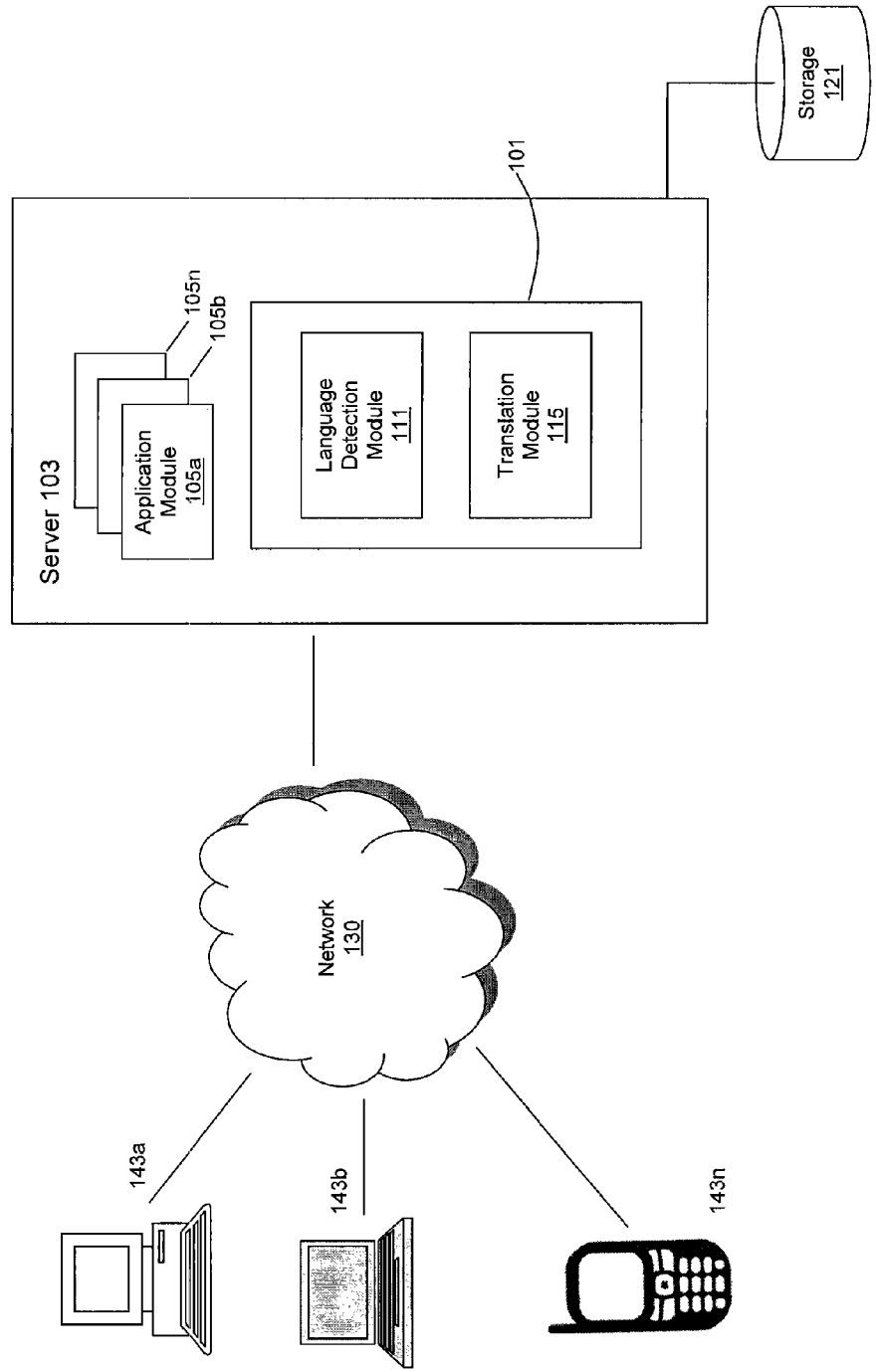

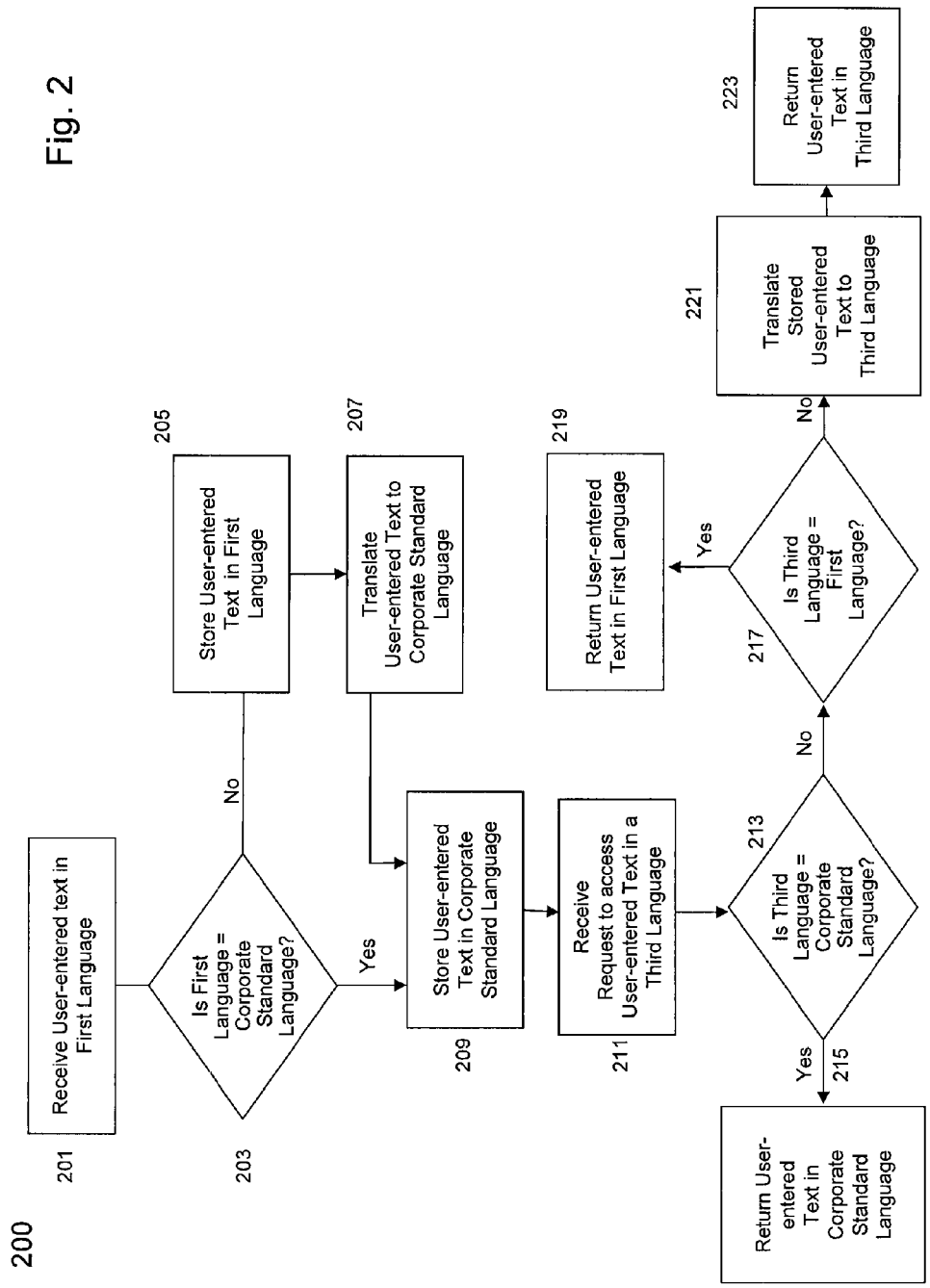

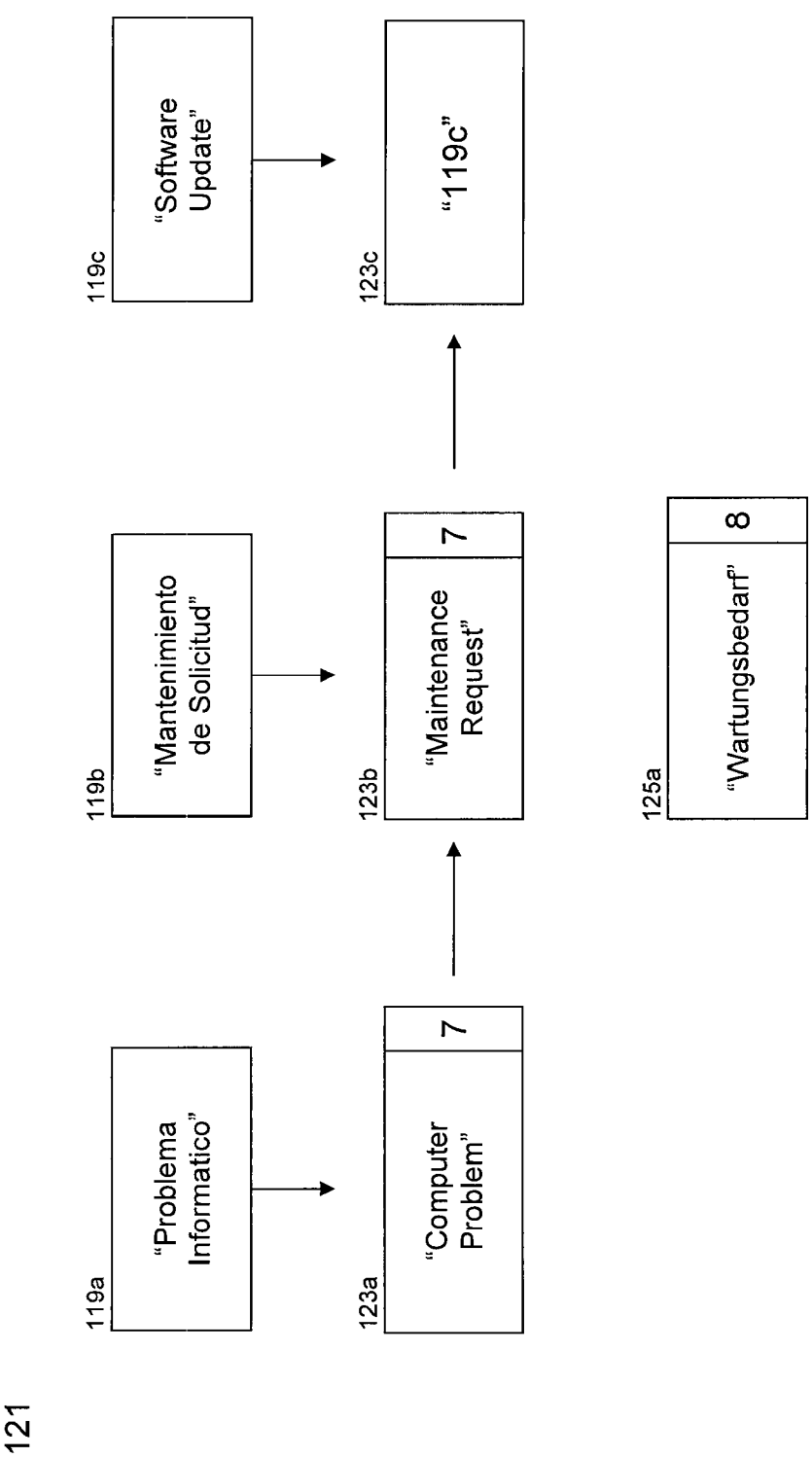

SYSTEM AND METHOD FOR MIXED-LANGUAGE SUPPORT FOR APPLICATIONS

FIELD OF THE INVENTION

The invention relates generally to systems and methods for providing multilingual support for a mixed-language audience, and more particularly to the use of direct translation of original text to additional languages to reduce quality loss.

BACKGROUND OF THE INVENTION

Language barriers have often been a challenge to effective communication in companies or other organizations that span multiple countries or regions or that generally have a diverse membership. An example of a context where multi-language issues may arise is an organization's information technology (IT) environment. In such an environment, supporting a plurality of users may involve supporting the many different languages spoken or written among the users. For example, employee self-service applications, such as a help desk or service desk application, may receive IT-related inquiries and comments in many different languages. In some instances, an employee of the organization in a United States office may submit a connectivity-related inquiry in English while a customer in Mexico may submit a software-related feedback in Spanish. The one or more applications associated with these communications may transmit the inquiries and comments as tickets to IT management personnel, such as a network administrator. The IT management personnel may need to be able to respond to tickets containing texts in many different languages. Moreover, the IT management personnel may themselves reside in different regions and speak many different languages (including those other than English and Spanish, per the given example).

While machine translation capabilities may be used to address language issues by making translation of information in a "just-in-time" manner more feasible, the manner in which machine translations is typically used presents numerous problems, including degradation of translation quality among multiple languages.

SUMMARY

In some implementations, the invention provides systems and methods for multilingual support in computer applications. The systems and methods may facilitate communication among users who may not use or understand the same language. The systems and methods may provide translations from an original language of a user communication to another language, such as a standard language adopted by a computing environment in which the computer applications operate. The standard language translation may be used to respond to requests to access the user communication in the standard language. If a request were received to access the user communication in a third language different from the original and standard language, a further translation may be provided from the original language to the third language. By translating from the original rather than the standard language version of the user communication, cumulative inaccuracies from multiple translations may be reduced.

In some implementations, a system of the invention may be part of a computing environment, such as an information technology (IT) environment or information systems environment. The system may be communicatively linked to one or more client interaction devices of the environment through a network. The system may include, among other things, one or more servers and one or more storage devices, which may be part of or external to the one or more servers. The one or more servers may execute one or more modules, including a module to run one or more computer applications, a module to determine a language of user communications received by the system, a module to obtain translations of the received user communications, and/or any other modules.

In some implementations, a method of the invention may include a plurality of operations for receiving user communications and facilitating later access to the communications in a variety of languages. For example, the operations may include receiving a user communication from a client interaction device; determining an original language of the user communication; translating the user communication from the original language to a standard language; storing the original user communication and the standard language translation; receiving a subsequent request to access the stored user communication; determining whether an access language associated with the request is the same as the user communication's original language or the standard language; if the access language matches the original or standard language, outputting the stored original user communication or its stored standard language translation; if the access language does not match the original language and does not match the standard language, translating the stored original user communication into the access language and outputting the translation. The operations may be performed in a variety of sequences, and one or more operations may be skipped. For example, if a received user communication were already in a standard language, the operation for translating the communication into the standard language may be skipped.

In some implementations, the standard language may be a language adopted by a computing environment in which the client interaction device resides. Many or most users of the environment may use the standard language, and all user communications may be recorded in the standard language.

In some implementations, the operations may also include storing the access language translations. If a further access request is determined to match a stored access language translation, the stored translation may be outputted. The output may be provided to, for example, one or more of application modules 105a-105n, or directly to network 130.

Various other objects, features, and advantages of the invention will be apparent through the detailed description and the drawings attached hereto. It is also to be understood that both the foregoing summary and the following detailed description are exemplary and not restrictive of the scope of the invention.

BRIEF DESCRIPTION OF THE DRAWINGS

FIG. 1 illustrates an example of an environment that includes a system for providing mixed-language support for applications, according to various implementations described in this disclosure.

FIG. 2 illustrates an example instruction flow between various components for providing mixed-language support for applications, according to various implementations described in this disclosure.

FIG. 3 illustrates an example of stored user communications and translations for providing mixed-language support for applications, according to various implementations described in this disclosure.

DETAILED DESCRIPTION OF THE INVENTION

FIG. 1 illustrates an environment 100, which is an example of an environment in which a system for providing multilingual support to one or more computer applications may reside. In some implementations, environment 100 may be an information technology (IT) environment, an Internet-based sales and customer support environment, or any other computing environment. For example, environment 100 may include a corporate IT environment that may need to support network users and network administrators who need to communicate but who may not understand the same language.

In some implementations, environment 100 may include a system 101, client interaction devices 143a-143n, and a network 130 that may communicatively link system 101 and the client interaction devices.

In some implementations, system 101 may include at least one server, such as server 103, and at least one storage device, such as storage device 121. Server 103 may have one or more processors and/or any other computing circuitry for implementing one or more applications, modules, and/or other computer-executable instructions. For example, server 103 may execute one or more application modules 105a-105n, a language detection module 111, a translation module 115, and/or other modules. In some implementations, system 101 may include a plurality of servers distributed across network 130. In some implementations, system 101 may include a plurality of servers that are communicatively coupled to each other through an interconnect such as Infiniband, Fibre Channel, and/or any other switched fabric or communication interface.

Server 103 may include or be communicatively linked to one or more storage devices, such as, for example, storage device 121. In some implementations, storage device 121 may be part of server 103. In some implementations, storage device 121 may be external to server 103 and be communicatively linked to server 103 via a direct wired or wireless connection or an indirect connection, such as a connection over network 130 or other network. A storage device may include a hard drive, tape drive, disk array, optical storage media, solid state storage media, volatile memory, and/or any other type of storage media.

In some implementations, network 130 may be part of the Internet. In some implementations, network 130 may include a local area network (LAN), a wide area network (WAN), or any other type of network that communicatively links computing resources such as servers, storage devices, and client interaction devices.

In some implementations, client interaction devices 143a-n may include one or more desktops, laptops, mobile devices (such as, for example, a smartphone, personal digital assistant, tablet computer), and/or any other type of client computing device.

System 101 or similar systems according to the invention may be used in other computing environments (including other types of enterprise environments). Further, environment 100 may include features other than those mentioned above. These other features may include additional servers, desktops, laptops, mobile devices, routers, switches, and/or other computing devices. For example, environment 100 may include one or more translation servers that are external to system 101.

The modules of system 101 may be executed on a server such as server 103, on a server other than server 103, on a single server, or on a plurality of servers. In some implementations, application modules 105a-105n may be executed by server 103 to run a computer application (e.g., a help desk application, a service desk application, a teleconferencing application, a social networking application, and/or any other kind of computer application). Application modules 105a-105n may be able to receive user communication sent by a client interaction device, such as user-entered text sent by a client interaction device 43. Application modules 105a-105n may further be able to store the received user communication and/or a translation of the user communication, and may be able to relay the received communication and/or the translation to another client interaction device, such as client interaction device 45. A user communication may include text, audio data, image data, and/or any other format capable of encoding spoken or written language. Text entered by a user may be referred to herein as "free text," which may include questions, comments, or other text inputted into a text receiving area such as a text box. In some implementations, the text receiving area may be part of a webpage, chat window, or other application interface displayed on a client interaction device. User-entered text may include enumerated text, such as text associated with a predefined set of user-selectable options. In some implementations, a predefined set of texts (or any other form of communication) may be associated with states of a checkbox, a radio button, a button, a drop down selection box, or any user input with a predefined set of input values. Text includes any alphanumeric character or any other symbol used in a language, such as symbols in the Unicode character set. In some implementations, system 101 may include a voice-to-text module or an optical character recognition module to convert communications received in an audio or image file format to a text format.

In some implementations, language detection module 111 may be executed on a server, such as server 103, to determine a language of a user communication received by system 101. In some implementations, language detection module 111 may comprise instructions for detecting a language of user-entered text and/or other form of user communication through meta data received with the user communication. In some implementations, language detection module 111 may comprise instructions for inferring the language of the user-entered text from other meta data, such as a location or user identity from which the user-entered text (or other form of communication) originated. In some implementations, language detection module 111 may comprise instructions for accessing a user profile associated with the user-entered text. A user profile file may specify one or more languages, locations, and/or any other personal and other information associated with a user of environment 100. In some implementations, language detection module 111 may comprise instructions for identifying settings selected on a client interaction device associated with the user communication. In some implementations, language detection module 111 may comprise instructions for inferring the language of the user-entered text (or other form of communication) based on symbols, characters, or words of the text and/or on the text's structure, such as the syntax, grammar, and/or punctuation.

In some implementations, translation module 115 may be executed by a server, such as server 103, to obtain a translation of user communication received by system 101. In some implementations, translation module 115 may comprise instructions for performing a machine translation. In some implementations, translation module 115 may include sub-modules for specific languages. For example, module 115 may have one sub-module for translations from Spanish to English, and another sub-module for translations from German to English.

In some implementations, translation module 115 may comprise instructions for submitting a translation request. For example, translation module 115 may cause system 101 to submit a translation request to an external machine translation server or to a human translation service. In some implementations, translation module 115 may select between machine translation and human translation based on speed, cost, quality, and/or any other requirements for the translation.

FIG. 2 illustrates a process 200 which is an example process for providing multilingual support to applications.

In an operation 201, user-entered text (or any other form of user communication) may be received in a first language. The text may be received by, for example, one or more modules being executed by server 103 of system 101, or by any other server of system 101 or any other system of a computing environment. In one example, one or more of application modules 105a-105n may receive the text.

In an operation 203, the language of the user-entered text may be determined by, for example, language detection module 111. Language detection module 111 may receive the user-entered text from, for example, the one or more of application modules 105a-105n, or directly from network 130. In some implementations, the language may be determined by accessing meta data, such as header data in a packet in which the user-entered text (or any other form of communication) was sent. The header may expressly identify the language of the user-entered text, may identify a location (e.g., country or region) from which the user-entered text originated, or may identify a user identity. In some implementations, the language may be determined by accessing a user profile associated with the user-entered text. A user profile file may be stored on a client interaction device, such as client interaction device 143 of environment 100, from which the received user communication originated. A user profile may be stored on a server, such as server 103 of system 101 or of another system. A user profile may be accessible by one or more modules, such as one or more of application modules 105a-n. Each user profile file may be associated with one or more users who interact with environment 100. In some implementations, the language may be determined by accessing a browser setting of one or more web browsers being run on a client interaction device. For example, the browser settings may indicate character encoding selections (e.g., a "Chinese Simplified" encoding), home page preferences (e.g., "www.mundodeportivo.com"), and/or other browser setting related to a language used on the browser. In some implementations, the language may be determined by examining the words, symbols, syntax, or general structure of the user-entered text. For example, the user-entered text may be compared against models of different languages. The language with the model that most closely matches the user-entered text may be assumed to be the text's language.

In some implementations, operation 203 may determine whether the language of the user-entered text is the same as a predetermined standard language of a computing environment, such as environment 100, an application associated with modules 105a-105n, an enterprise associated with system 101, or otherwise specified standard language. The predetermined standard language may provide a default language of the computing environment to which all user communication in all other languages are translated. For example, if environment 100 were a corporate IT environment in which a majority or large portion of users understand English, English may be adopted as a corporate standard language of environment 100. All communications received from environment users by a system for providing multilingual support may be recorded in at least the standard language. For example, when a user of environment 100 communicates a service request, inquiry, report, any other user-entered text, or any other communication, the communication may be translated to and stored in English if the original communication was not already in English. If a computing environment adopted multiple standard languages, a received communication may be recorded in all or a subset of the multiple standard languages.

In an operation 205, if the received user-entered text is in a language other than a standard language, the text may be stored in its original language before it is translated. The original user-entered text (or any other form of user-entered communication) may be stored to facilitate future translations because translating from the original text may yield less cumulative inaccuracies than translating a previous translation. FIG. 3 illustrates example stored user-entered texts and their translations. As shown, original (e.g., Spanish) versions 119a and 119b of user-entered text may be stored in storage device 121 or any other storage device of any other system before the texts are translated to a standard language (e.g., English).

In some implementations, the order of operations 205 and 203 may be reversed, in which the original user-entered text may be stored before its language is compared against the standard language. In such cases, operation 205 may store an original version of user-entered text even if it is already in a standard language (e.g., English). For example, as shown in FIG. 3, an original, English version 119c may be stored in storage device 121 or any other storage device. In some implementations, operations 205 and 203 may be performed simultaneously.

In an operation 207, the user-entered text may be translated from its received, original language to the standard language. The translation may be obtained by translation module 115 or by any other module and/or device of system 101 or any other system. The translation may be a machine translation, a human translation, or any combination thereof.

In some implementations, operation 207 may include selecting between a machine translation and a human translation service. The selection may be based on time, cost, and quality factors. For example, if the user-entered text is determined to be important and imminent access of the user-entered text is determined to be unlikely, the translation may be obtained from a human translation service. In another example, a human translation service may be determined to be too slow to provide a just-in-time translation for a user. In another example, it may be determined that human translation is needed for user communication received in an audio format because available machine translation servers may have limited or no ability to translate voice data.

In some implementations, operation 207 may be skipped if the language of received user-entered text is the same as the standard language.

At operation 209, a standard language version of the user-entered text may be stored in a storage medium, such as storage device 121. Storing the user-entered text in a standard language such as English may provide a uniform format in which the text can be reviewed and recorded. Users who may need to respond to or review the user-entered text may need to be trained in just the standard language even when the user-entered texts may originally have been submitted in a variety of languages. The standard language version may be a translation from the received user-entered text. For example, FIG. 3 shows standard language versions 123a and 123b that are Spanish-to-English translations of stored original versions 119a and 119b, respectively, of received user-entered texts. The standard language version may be a duplication of the received user-entered text if both are in the same language. The duplicate may include a copy of the original version or a reference to the original version. For example, FIG. 3 shows a standard language version 123c that stores a reference to original version 119c of user-entered text.

In some implementations, operation 209 may be skipped if the language of received user-entered text is the same as the standard language. An original version stored at operation 205 may be used in the place of a standard language version.

In an operation 211, a request to access the stored user-entered text and its translation may be received. The request may be received by, for example, one or more of application modules 105a-105n. For example, user-entered text may be accessed by IT support personnel, network administrators, customer support personnel, and/or any other users interacting with a service desk application associated with one or more of modules 105a-105n. A network administrator, for example, may use the service desk application to access user-entered texts associated with network service requests previously received from users of the service desk application. The user-entered texts may have been received by system 101, for example, at operation 201.

In an operation 213, a language associated with the access request may be determined by, for example, language detection module 111. In some implementations, the language may be specified as part of the access request. For example, a network administrator may have to expressly specify that he or she needs to access user-entered text in French. In some implementations, the language may be inferred from the access request. For example, if the access request was submitted as a message in French or originated from a network address in France, then the language associated with the access request may be inferred to be French. In the example, a browser setting, user profile, or any other data on a client interaction device issuing the access request may also indicate the access language. In some implementations, if the access language cannot be determined, operation 213 may rely on a default selection. For example, the access request may be assumed to be in an environment's standard language unless another language is specified.

In an operation 215, if the access request is determined to be in the standard language, then the standard language version stored at operation 209 may be outputted. For example, if a request's access language is determined to be in English and the standard language is English, the stored English version of the requested user communication may be outputted. In some implementations, if the received user-entered text was already in the standard language, the original version stored at operation 205 may be outputted. The output may be provided to, for example, one or more of application modules 105a-105n, or directly to network 130.

In an operation 217, if an access language of a request is a third language that is not the standard language, the third language may be compared to the first language in which the user-entered text was originally received. The third language may be determined by accessing meta data, such as any packet header data associated with the request, by identifying a location from which the request originated, by accessing a user profile associated with the request, by accessing a browser setting associated with the request, and/or by examining any words, symbols, syntax, or general structure of the request. Determination of the third language may be performed by, for example, language detection module 111. In one example, a third language associated with a request may be determined to be Spanish based on a user profile or browser setting associated with a user making the request. In the example, it may be determined whether the stored original version (e.g., a version in the first language) of user-entered text is also in Spanish. If the third language is the same as the original language, the stored original user-entered text may be outputted at operation 219. The output may be provided to, for example, one or more of application modules 105a-105n, or directly to network 130.

In some implementations, operation 213 and 217 may be reversed. For example, in response to a request to access user-entered text, the access language may first be compared against the language of the original user-entered text, and then compared to the standard language. In some implementations, the operations may also be performed simultaneously.

In an operation 221, if the third language is not the same as either the standard language or the first language, then the stored original user-entered text may be translated to the third language. For example, FIG. 3 shows that if a request was received to access a German version of stored user-entered text 119b, it may be determined that neither original version 119b nor standard language version 123b can satisfy the request. A Spanish-to-German translation may be obtained to satisfy the request. Obtaining a direct Spanish-to-German translation from the original version the user-entered text, rather than an English-to-German translation, may reduce cumulative translation inaccuracies. The translation may be based on a machine translation, a human translation, or a combination thereof. In some implementations, a selection may be made between machine translation and human translation based on speed, cost, and quality factors. At operation 223, translation of the user-entered text to the third language may be outputted. The output may be provided to, for example, one or more of application modules 105a-105n, or directly to network 130.

In some implementations, the subsequent translations, such as that obtained at operation 221, may be stored in a storage medium, such as storage device 121. For example, FIG. 3 shows that a German version 125a corresponding to original, Spanish version 119b may be stored. When a subsequent request is received to access in German the user-entered text, the stored German translation may then be outputted. Outputting a text may include outputting the text for display, outputting the display for conversion to spoken text, or any other form of output.

In some implementations, multiple translations may be obtained for the same access language. For example, a machine translation may first be obtained for a user-entered text, and a human translation may later be obtained for the user-entered text into the same language. In the example, multiple machine translations, such as from different translation services, may also be obtained. In some implementations, one, some, or all of the multiple translations may be stored in a storage medium, such as storage device 121.

In some implementations, the translated versions of the user-entered text may be stored along with meta data indicating the quality and reliability of the translation. For example, FIG. 3 shows that standard language translations 123a and 123b may be stored with a meta data indicator of the quality of their translations (e.g., 7 on a scale of 10), and translated version 125a may be stored with a meta data indicator of the quality of its translation (e.g., 8 on a scale of 10).

In some implementations, standard language versions of related user communications may be stored as a sequential record in a storage medium, such as storage device 121. For example, FIG. 3 shows that original user-entered texts 119a, 119b, and 119c may be part of a single software maintenance issue. To facilitate future review of the software maintenance issue or any other issue to which the user communications are related, a sequential record in the standard language (e.g., English) may be maintained. In some implementations, a sequential record may be maintained by linking standard language versions of received user communications. For example, FIG. 3 shows that standard language versions 123a, 123b, and 123c may be linked to form a sequential record. In some implementations, a database may be used for linking user communications and/or their translations.

In some implementations, a standard language may also include a specific format for user-entered text. In one example, a standard language may use English and require that all user-entered text be categorized with XML tags. User-entered text that is in English but not marked up in XML may be translated to a format in which it is marked up in XML. In another example, a corporate standard language for an IT environment may require that any user-entered service request discuss software issues before hardware issues. User-entered text that discusses hardware issues before software issues may be translated to a format that places software discussions before hardware discussions.

In some implementations, one or more operations may be performed by one or more processors configured by executable instructions for performing a plurality of operations. The described operations may be accomplished using one or more of modules/sub-modules described herein (such as the modules shown in FIG. 1) and in some implementations, various operations may be performed in different sequences. In other implementations, additional operations may be performed along with some or all of the operations shown in FIG. 2. In yet other implementations, one or more operations may be performed simultaneously. In yet other implementations, one or more of operations may not be performed. Accordingly, the operations described are exemplary in nature and, as such, should not be viewed as limiting.

Implementations of the invention may be made in hardware, firmware, software, or various combinations thereof. The invention may also be implemented as computer-readable instructions stored on a non-transitory computer-readable storage medium which may be read and executed by one or more processors. A computer-readable storage medium may include various mechanisms for storing information in a form readable by a computing device. For example, a tangible, non-transitory computer-readable storage medium may include optical storage media, flash memory devices, and/or other storage media. Further, firmware, software, routines, or instructions may be implemented on processors, controllers, devices executing firmware, software, routines or instructions, and/or any other computing device.

Other embodiments, uses and advantages of the invention will be apparent to those skilled in the art from consideration of the specification and practice of the embodiments disclosed herein. The specification should be considered exemplary only, and the scope of the invention is accordingly intended to be limited only by the following claims.

What is claimed is:

1. A method of providing multilingual support in an enterprise application environment, the method comprising:
    obtaining a first translation of a user-entered communication in a first language, wherein the first translation is from the first language to a predetermined standard language;
    storing the first translation of the user-entered communication in the predetermined standard language with the user-entered communication in the first language;
    receiving a request to access the user-entered communication;
    determining a language associated with the request to access the user-entered communication;
    responsive to the language associated with the request to access the user-entered communication being the same as the predetermined standard language, providing the stored user-entered communication in the predetermined standard language to satisfy the request;
    responsive to the language associated with the request to access the user-entered communication being the same as the first language, providing the user-entered communication in the first language to satisfy the request; and
    responsive to the language associated with the request to access the user-entered communication being in a third language that is different from the first language and the predetermined standard language, obtaining a second translation of the stored user-entered communication directly from the stored user-entered communication in the first language to the third language.

2. The method of claim 1, wherein the user-entered communication is received from a user, wherein the user is associated with a user profile, and wherein the user profile specifies a preferred language associated with the user.

3. The method of claim 1, wherein the user-entered communication is associated with a first user and the request to access the user-entered communication is associated with at least a second user.

4. The method of claim 3, wherein the second user is associated with a user profile and wherein the user profile specifies a preferred language associated with the second user.

5. The method of claim 4, wherein the user profile specifies the preferred language of the second user based on a language setting of a web browser used by the second user.

6. The method of claim 4, wherein determining the language that is associated with the request to access the user-entered communication comprises accessing the user profile of the second user to determine whether the preferred language associated with the second user:
    is the same as a preferred language associated with the first user,
    is the same as the predetermined standard language, or
    is different from both the preferred language associated with the first user and the predetermined standard language.

7. The method of claim 1, further comprising storing the user-entered communication in the third language with the user-entered communication in the first language and the user-entered communication in the predetermined standard language.

8. A system to provide multilingual support in an enterprise application environment, the system comprising:
    a processor configured to:
        obtain a first translation of a user-entered communication in a first language, wherein the first translation is from the first language to a predetermined standard language,
        store the first translation of the user-entered communication in the predetermined standard language with the user-entered communication in the first language,
        receive a request to access the user-entered communication,
        determine a language associated with the request to access the user-entered communication,
        responsive to the language associated with the request to access the user-entered communication being the same as the predetermined standard language, provide the stored user-entered communication in the predetermined standard language to satisfy the request,
        responsive to the language associated with the request to access the user-entered communication being the same as the first language, provide the user-entered communication in the first language to satisfy the request, and responsive to the language associated with the request to access the user-entered communication being in a third language that is different from the first language and the predetermined standard language, obtain a second translation of the stored user-entered communication directly from the stored user-entered communication in the first language to the third language.

9. The system of claim 8, wherein the user-entered communication is received from a user, wherein the user is associated with a user profile, and wherein the user profile specifies a preferred language associated with the user.

10. The system of claim 8, wherein the user-entered communication is associated with a first user and the request to access the user-entered communication is associated with at least a second user.

11. The system of claim 10, wherein the second user is associated with a user profile and wherein the user profile specifies a preferred language associated with the second user.

12. The system of claim 11, wherein the user profile specifies the preferred language of the second user based on a language setting of a web browser used by the second user.

13. The system of claim 11, wherein the processor is configured to determine the language that is associated with the request to access the user-entered communication by accessing the user profile of the second user to determine whether the preferred language associated with the second user:
is the same as a preferred language associated with the first user,
is the same as the predetermined standard language, or
is different from both the preferred language associated with the first user and the predetermined standard language.

14. The system of claim 8, wherein the processor is further configured to store the user-entered communication in the third language with the user-entered communication in the first language and the user-entered communication in the predetermined standard language.

15. A non-transitory computer-readable medium comprising a computer-readable instruction thereon which, when executed by a processor, causes the processor to:
obtain a first translation of a user-entered communication in a first language, wherein the first translation is from the first language to a predetermined standard language,
store the first translation of the user-entered communication in the predetermined standard language with the user-entered communication in the first language,
receive a request to access the user-entered communication,
determine a language associated with the request to access the user-entered communication,
responsive to the language associated with the request to access the user-entered communication being the same as the predetermined standard language, provide the stored user-entered communication in the predetermined standard language to satisfy the request,
responsive to the language associated with the request to access the user-entered communication being the same as the first language, provide the user-entered communication in the first language to satisfy the request, and
responsive to the language associated with the request to access the user-entered communication being in a third language that is different from the first language and the predetermined standard language, obtain a second translation of the stored user-entered communication directly from the stored user-entered communication in the first language to the third language.

16. The non-transitory computer-readable medium of claim 15, wherein the user-entered communication is received from a user, wherein the user is associated with a user profile, and wherein the user profile specifies a preferred language associated with the user.

17. The non-transitory computer-readable medium of claim 15, wherein the user-entered communication is associated with a first user and the request to access the user-entered communication is associated with at least a second user.

18. The non-transitory computer-readable medium of claim 17, wherein the second user is associated with a user profile and wherein the user profile specifies a preferred language associated with the second user.

19. The non-transitory computer-readable medium of claim 18, wherein the user profile specifies the preferred language of the user based on a language setting of a web browser used by the second user.

20. The non-transitory computer-readable medium of claim 18, wherein the computer-readable instruction, when executed by the processor, causes the processor to determine the language that is associated with the request to access the user-entered communication by accessing the user profile of the second user to determine whether the preferred language associated with the second user:
is the same as a preferred language associated with the first user,
is the same as the predetermined standard language, or
is different from both the preferred language associated with the first user and the predetermined standard language.

21. The non-transitory computer-readable medium of claim 15, wherein the computer-readable instruction, when executed by the processor, further causes the processor to store the user-entered communication in the third language with the user-entered communication in the first language and the user-entered communication in the predetermined standard language.

* * * * *